United States Patent [19]

Kondo et al.

[11] Patent Number: 5,099,401

[45] Date of Patent: Mar. 24, 1992

[54] SIGNAL LIGHTING FIXTURE FOR VEHICLES

[75] Inventors: Toshiyuki Kondo, Funabashi; Osamu Waki, Mitaka, both of Japan

[73] Assignee: Stanley Electric Co., Ltd., Tokyo, Japan

[21] Appl. No.: 737,709

[22] Filed: Jul. 30, 1991

[30] Foreign Application Priority Data

Jul. 8, 1990 [JP] Japan ................................ 2-83692

[51] Int. Cl.⁵ .............................................. B60Q 1/26
[52] U.S. Cl. ................................... 362/80.1; 362/240; 362/390
[58] Field of Search ................. 362/80.1, 61, 240, 390

[56] References Cited

U.S. PATENT DOCUMENTS 5,038,255 8/1991 Nishihashi et al. ................. 362/240

FOREIGN PATENT DOCUMENTS 64-81103 3/1989 Japan .

Primary Examiner—Carroll B. Dority
Attorney, Agent, or Firm—Frishauf, Holtz, Goodman & Woodward

[57] ABSTRACT

The present invention discloses a light fixture provided internally of a compartment of a vehicle close to a rear window. The lighting fixture comprises a cylindrical housing, a base plate holder, and an LED base plate. The housing is formed from a flexible member. A suitable number of antivibration members are engaged within the LED base plate.

6 Claims, 2 Drawing Sheets

SIGNAL LIGHTING FIXTURE FOR VEHICLES

BACKGROUND OF THE INVENTION

1. Field of the Invention

The present invention relates to an auxiliary brake lamp generally called a high mount stop lamp, and more specifically to the structure of a lighting fixture provided internally of a compartment close to a rear window.

2. Prior Art

As conventional signal lighting fixtures for vehicles of this kind, there is a lighting fixture for a vehicle disclosed in Japanese Patent Laid-Open No. 64-81103 publication filed by the same applicant as the present applicant.

However, the aforesaid conventional lighting fixture or a vehicle has problems in that when a horizontal curve of a rear window on which the lighting fixture is mounted is large, a central portion thereof is greatly embossed from the rear window, and as a result, a projecting amount into the compartment increases, that readiness in adjustment of irradiation direction after mounting is short, and that since the central portion is not supported on a housing, an LED substrate is apt to recive vibrations due to the vibrations when an automobile runs. These problems should be improved.

SUMMARY OF THE INVENTION

For solving the aforementioned problems, according to the present invention, there is provided a signal lighting fixture for a vehicle comprising a cylindrical housing formed from a transparent member having opposite ends opened, a base plate holder provided with mounting legs mounted on said opposite ends of said housing and rotatable base plate mounting portions engaged within said mounting legs, and LED base plates mounted on said base plate mounting portions of said base holder, characterized in that said housing is formed from a soft member, said mounting leg is formed into a hollow short tube, a portion located externally of said housing comprises a knob portion and an internal portion is held through the base plate holder as the base plate mounting portion, and a suitable number of antivibration members are engaged within said LED base plate, said antivibration member being formed into a substantially C-character shape, having an outer diameter placed in contact with an inner diameter of said housing and having an inner diameter fitted into said LED base plate.

DESCRIPTION OF THE PREFERRED EMBODIMENTS

Figure 1:
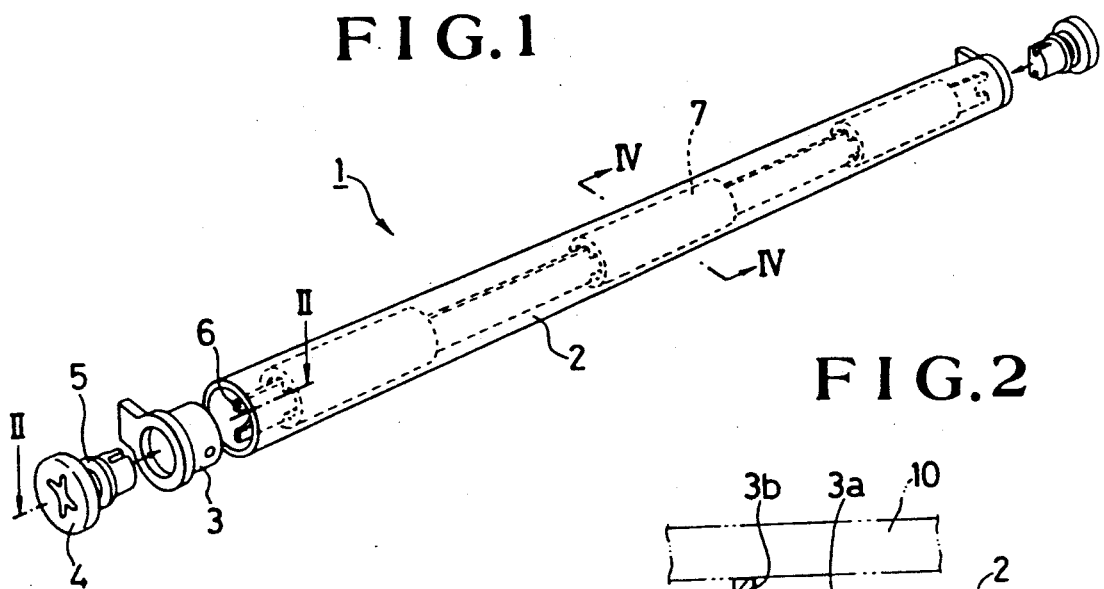
FIG. 1 is a perspective view showing one embodiment of a signal lighting fixture for a vehicle according to the present invention.

The present invention will be described hereinafter by way of an embodiment shown in the drawings.

A signal lighting fixture for a vehicle according to the present invention is indicated at 1 in FIG. 1. A housing 2 of the signal lighting fixture 1 is similar to the aforementioned prior art in that the housing is formed from a transparent resin member into a hollow cylindrical shape having opposite ends opened. However, according to the present invention, the housing 2 is formed from a relatively soft material so as to have a suitable flexibility.

Figure 2:
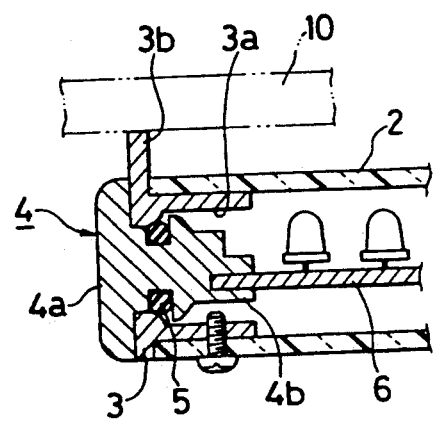
FIG. 2 is a sectional view taken on line II—II of FIG. 1.

A mounting leg 3 and a base plate holder 4 are mounted on openings on the opposite ends of the housing 2 similarly to the prior art. In this case, as shown in FIG. 2 in an enlarged scale, the mounting leg 3 is formed into a short tube provided at the center with a hollow portion 3a and secured to the end of the housing 2. In addition, a flat portion 3b is provided on the outer diameter side of the leg 3 so that the latter can be mounted on a rear window 10 by means such as adhesives.

The base plate holder 4 is formed at a portion located externally of the housing 2 with a substantially umbrella-shaped knob portion 4a and formed at a portion interally thereof with a base plate mounting portion 4b. The holder 4 is engaged within the hollow portion 3a of the mounting leg 3 through an O-ring 5, whereby the base plate holder 4 is rotatable with respect to the mounting leg 3.

An LED base plate 6 is mounted on the base plate mounting portion 4b of the base plate holder 4 similarly to the prior art. In this case, the LED base plate 6 has preferably a suitable flexibility similarly to the aforementioned housing 2, and is formed from a member having a flexibility, for example, such as a glass epoxy base plate.

Figure 3:
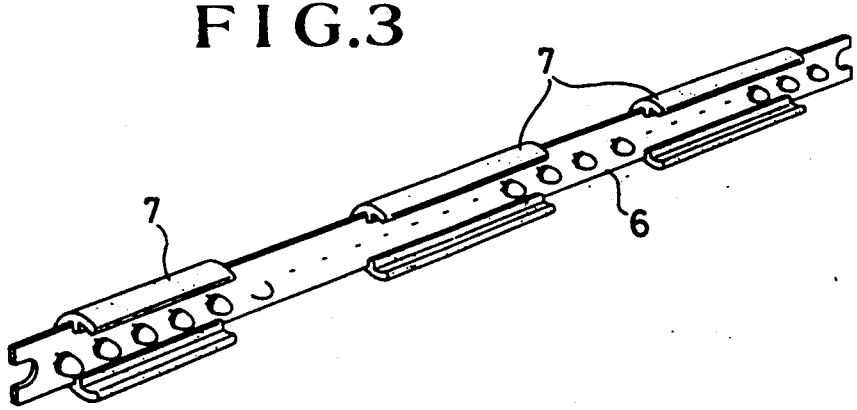
FIG. 3 is a perspective view showing essential parts of the above-described embodiment.

Furthermore, a suitable number of antivibration members 7 formed from resin members or the like into a substantially C-shaped section as shown in FIG. 3 according to the present invention are engaged within the LED base plate 6.

Figure 4:
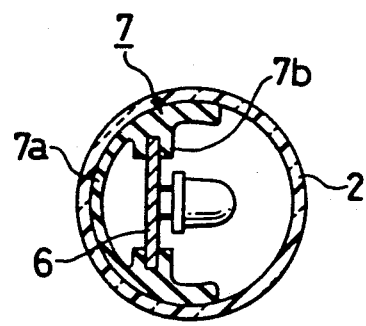
FIG. 4 is a sectional view taken on line IV—IV of FIG. 1.

FIG. 4 shows in detail the aforesaid antivibration member 7. The antivibration member 7 has an outer diameter 7a placed in sliding contact with the inner diameter of the housing 2 and an inner diameter side provided with a base plate engaging portion 7b to be engaged within the LED base plate 6, whereby the antivibration member 7 can be mounted at a free position of the LED base plate 6. Moreover, since the antivibration member 7 is also placed in sliding contact with the inner diameter of the housing 2, when the LED base plate 6 is rotated by the base plate holder 4, the antivibration member 7 rotates together with the LED substrate 6.

In the following, the function and effect of the signal lighting fixture for a vehicle 1 according to the present invention having the structure as described above will be explained.

Figure 5:
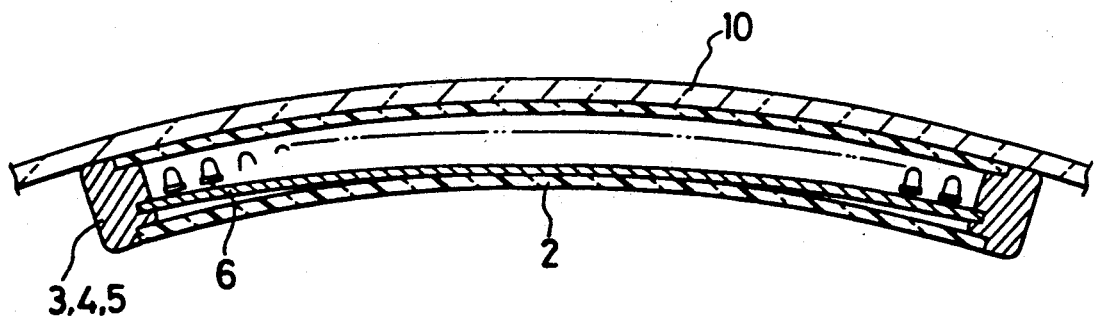
FIG. 5 is an explanatory view showing the mounting state of the signal lighting fixture for a vehicle according to the present invention.

First, since the housing 2 is formed from a soft flexible member, even when the housing 2 is mounted on the curved rear window 10 at the mounting leg 3 with adhesives as shown in FIG. 5, the housing Z is curved along the curved surface of the rear window glass 10 to render possible to provide a arrangement in which the central portion thereof is not embossed. Particularly, in a case where the signal lighting fixture 1 is lengthy, it is possible to greatly reduce the projecting amount toward the interior of the compartment.

To further make positive the curve of the housing 2 along the curved surface of the rear window glass 10, a flat portion similar to the mounting leg 3 may be suitably provided also in the central portion, for example, of the housing 2.

The mounting leg 3 and the base plate holder 4 are designed so that the mounting leg 3 is formed into a short tube, through which the base plate holder 4 extends so as to reach the exterior. With this arrangement, when the irradiation direction is adjusted with the LED base plate 6 made in correspondence to the inclination of the rear window glass 10, the knob portion 4a provided on the base plate holder 4 may be used to simplify the operation.

In addition, since the antivibration members 7 are engaged within the LED base plate 6, first, even when the housing 2 is curved along the rear window glass 10 as described above, the LED base plate 6 is held at a predetermined position within the housing 2 by the anti-vibration members 7 to prevent the LED base plate 6 from contacting the housing 2 as shown in FIG. 5 and prevent a variation of light distribution characteristics resulting from a deviation thereof from a predetermined position. Secondly, the vibrations particularly in the central portion resulting from the running of an automobile generated in the LED base plate supported merely by the opposite ends can be prevented by the antivibration members 7 placed in contact with the inner diameter of the housing 2.

As described above, according to the present invention, the housing is formed from a soft member and the antivibration memebers in contact with the inner diameter of the housing and fitted into the LED base plate are provided. With this arrangement, even when the signal lighting fixture according to the present invention is mounted on the curved rear window glass, it can be mounted curvedly along the curve thereof thereby reducing the projecting amount into the compartment and improving the beauty. Furthermore, the mounting leg is formed into a short tube, through which the base plate holder extends so as to reach the exterior. With this arrangement, the adjustment of irradiation direction at the time of mounting can be simplified, and vibrations of the LED base plate caused by the vibrations while the automobile runs can be prevented by the antivibration members. Thus, the present invention provides the excellent effect in improving the practical property of the signal lighting fixture for a vehicle of this kind.

What is claimed is:

1. A signal lighting fixture for a vehicle, comprising:
   a transparent cylindrical housing having its opposite ends open;
   a base plate inside said housing with light emitting devices secured thereon, and extending between said opposite ends of the housing;
   a base plate holder at each of said opposite ends of the housing and having a mounting portion retained within the housing and a knob extending out of said housing, said mounting portion being rotatable by said knob, said base plate having its respective opposite ends attached to said mounting portion of the base plate holders at said opposite ends of the housing; and
   at least one antivibration member positioned within said housing and having a C-type of shape in a transverse cross section, an outer surface thereof being in contact with said housing and a portion of an inner surface thereof being secured to said base plate.

2. A signal lighting fixture according to claim 1, wherein said portion of the inner surface of the antivibration member includes a groove into which said base plate is fitted.

3. A signal lighting fixture according to claim 1, further comprising a mounting leg positioned at each of said opposite ends of the housing and formed into a short, hollow tube having a first portion fitted into said housing and accommodating therein said mounting portion of the base plate holder.

4. A signal lighting fixture according to claim 3, wherein said mounting leg further comprises a flat portion on an outer surface of a second portion of said tube extending outside of said housing, whereby said flat portion of the mounting leg can be adhered to a rear window of said vehicle.

5. A signal lighting fixture according to claim 1, wherein said housing is flexible.

6. A signal lighting fixture according to claim 1, wherein said base plate is formed from a glass epoxy.

* * * * *

UNITED STATES PATENT AND TRADEMARK OFFICE
CERTIFICATE OF CORRECTION

PATENT NO. : 5,099,401
DATED : March 24, 1992
INVENTOR(S) : KONDO et al

It is certified that error appears in the above-identified patent and that said Letters Patent is hereby corrected as shown below:

Title page, Section [30] Foreign Application Priority Data -

Change the Japanese application filing date from "Jul. 8, 1990" to --August 7, 1990--.

Column 2, line 26, change "Z" to --2--.

Column 2, line 65, change "Z" to --2--.

Signed and Sealed this

Fourteenth Day of September, 1993

Attest:

BRUCE LEHMAN

Attesting Officer     Commissioner of Patents and Trademarks